No. 819,269. PATENTED MAY 1, 1906.
W. B. FENN.
MACHINE FOR MAKING FIBROUS PACKINGS.
APPLICATION FILED JAN. 10, 1905.
6 SHEETS—SHEET 1.
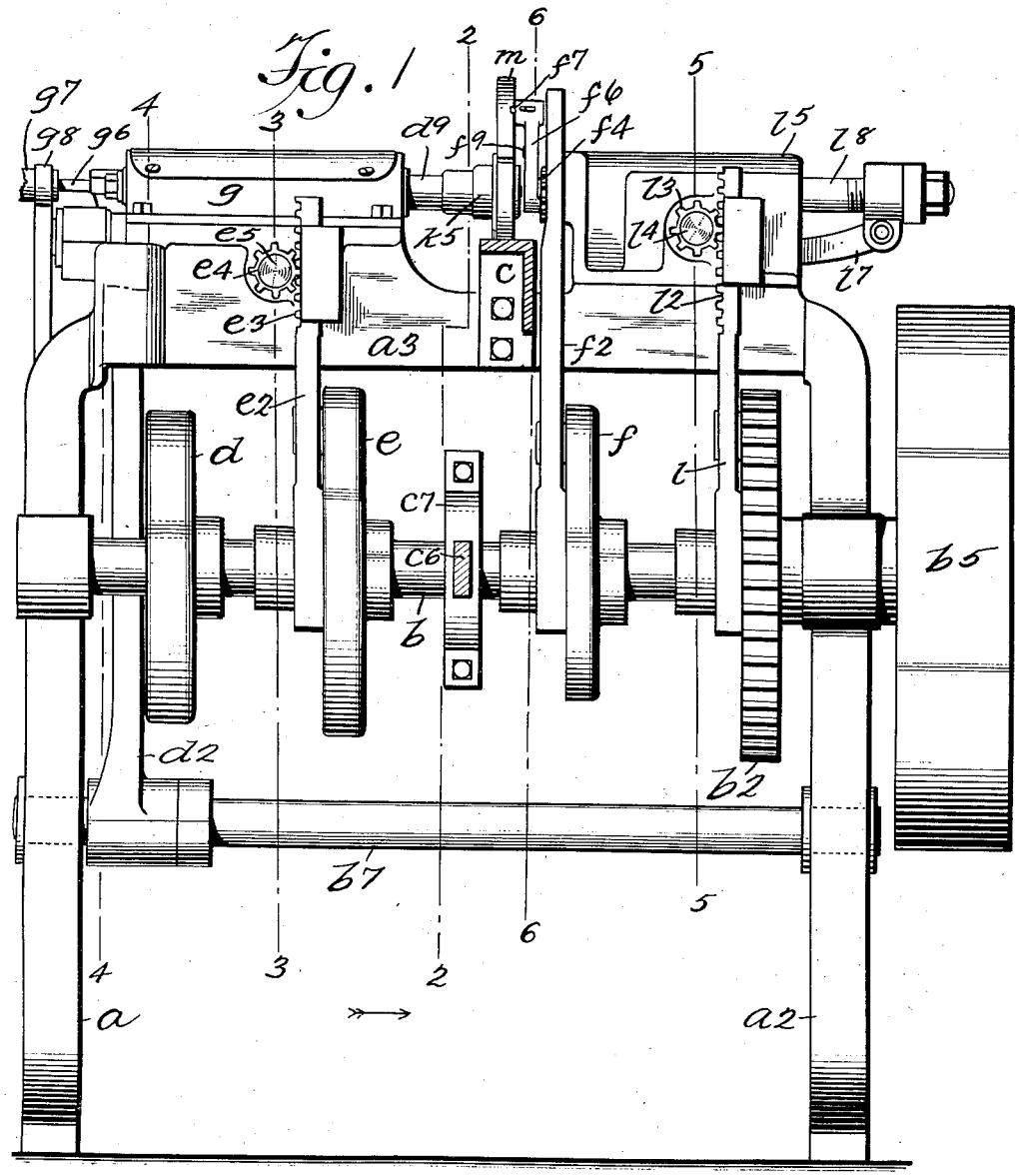
WITNESSES
INVENTOR
William B. Fenn
BY
Edgar Tate & Co
ATTORNEYS

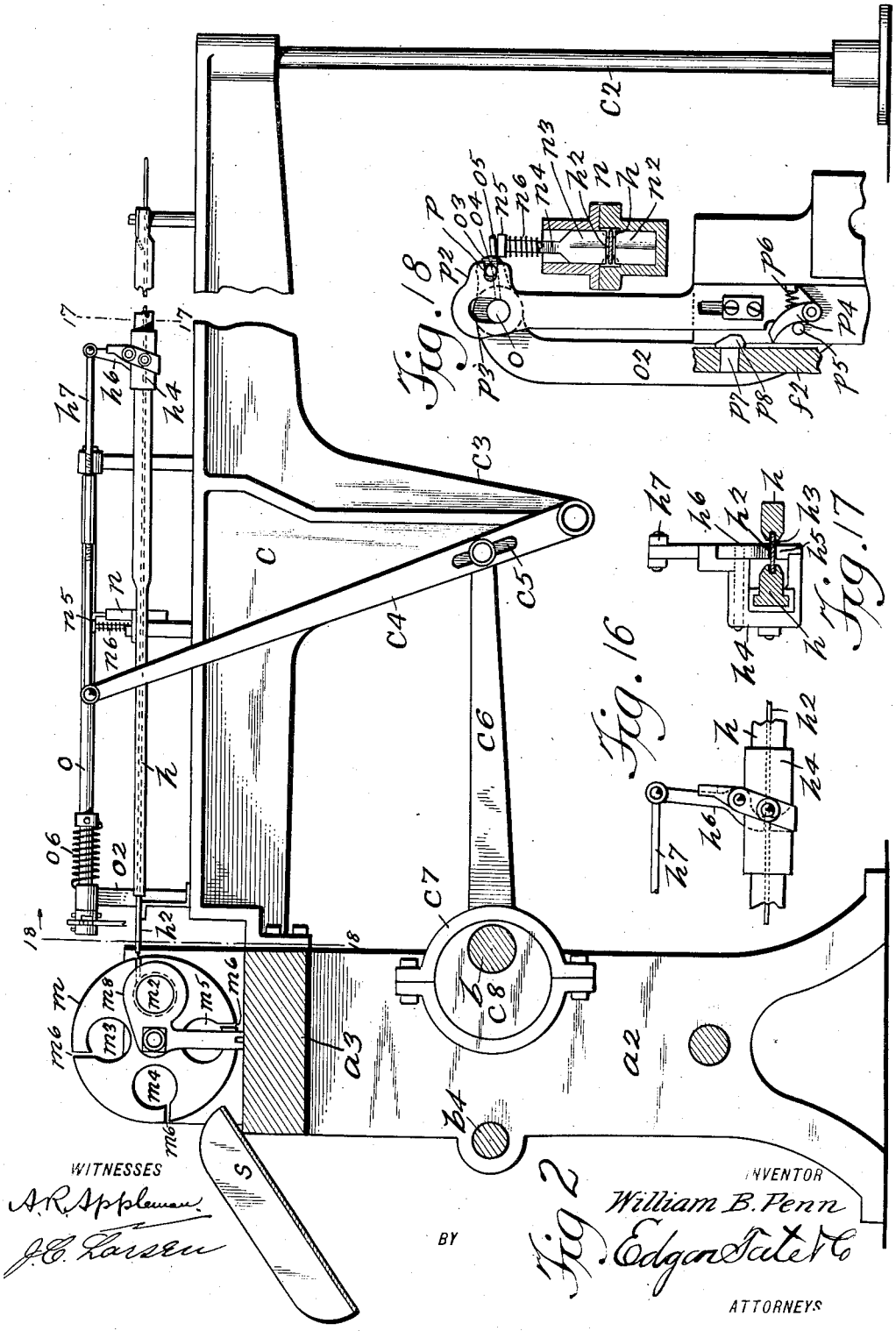

No. 819,269. PATENTED MAY 1, 1906.
W. B. FENN.
MACHINE FOR MAKING FIBROUS PACKINGS.
APPLICATION FILED JAN. 10, 1905.
6 SHEETS—SHEET 3.
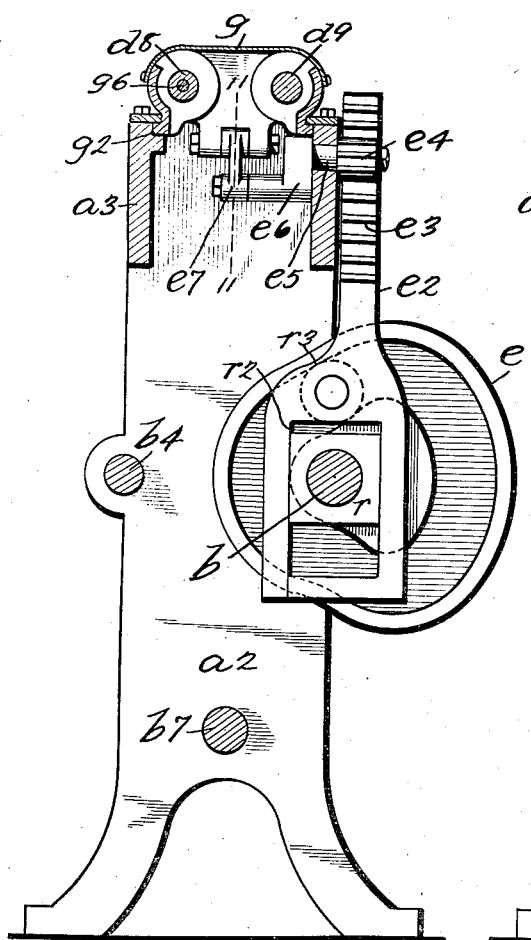
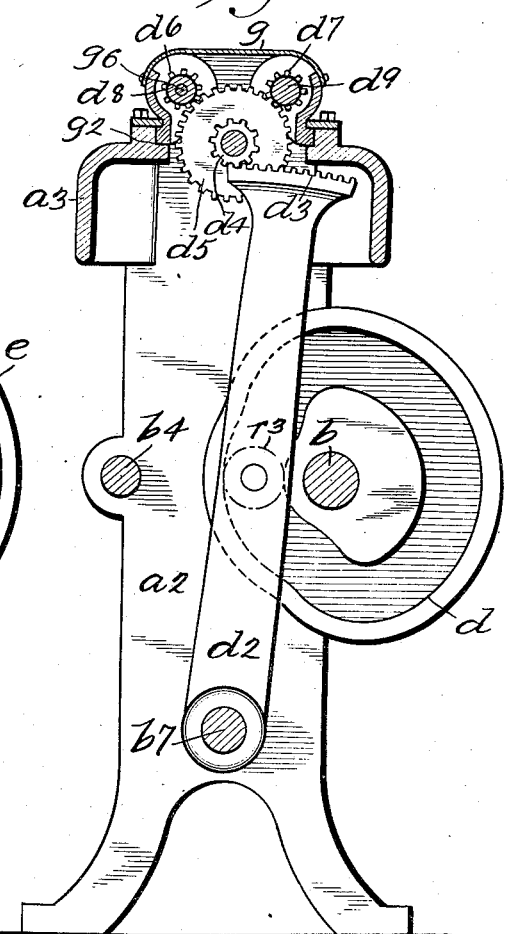
WITNESSES
INVENTOR
William B. Fenn
BY Edgar Tate & Co
ATTORNEYS

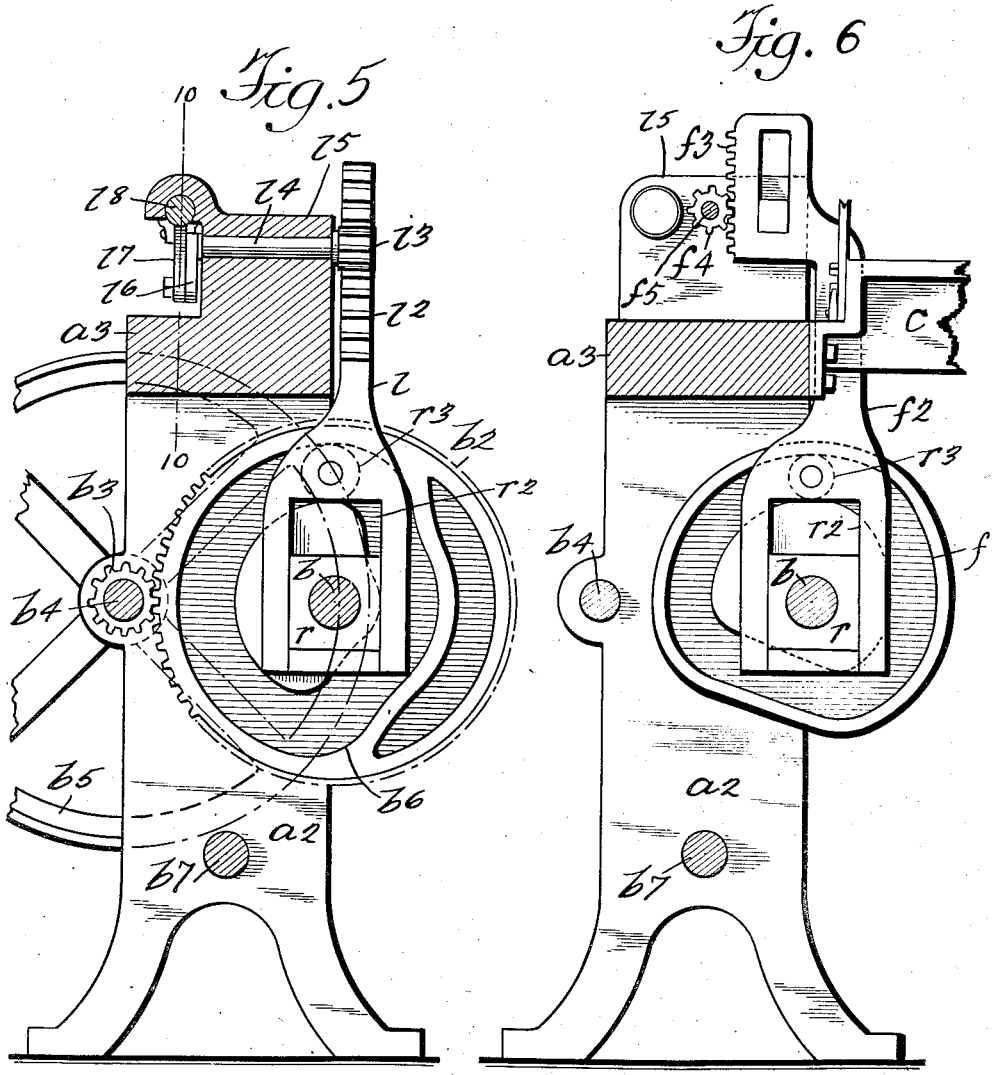

No. 819,269. PATENTED MAY 1, 1906.
W. B. FENN.
MACHINE FOR MAKING FIBROUS PACKINGS.
APPLICATION FILED JAN. 10, 1905.
6 SHEETS—SHEET 5.
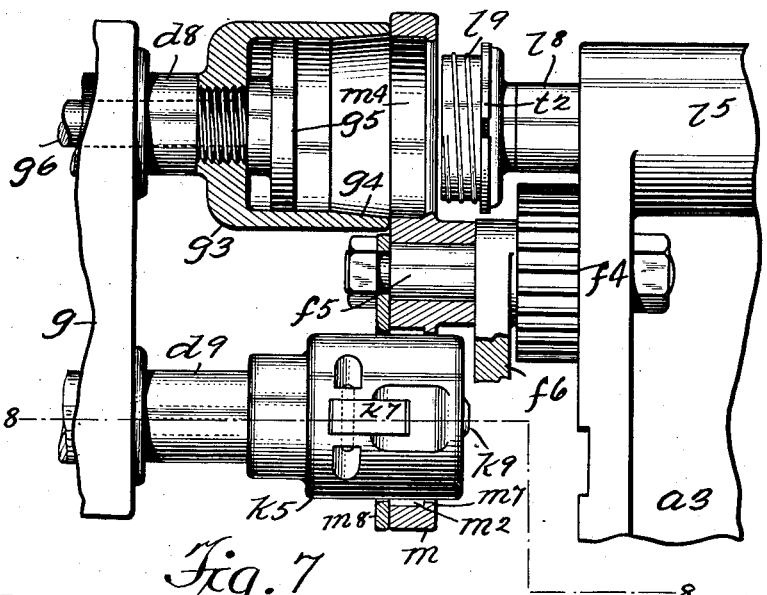
Fig. 7
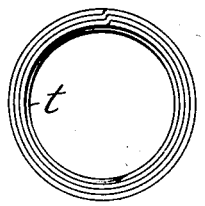
Fig. 19.   Fig. 8
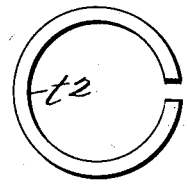
Fig 15
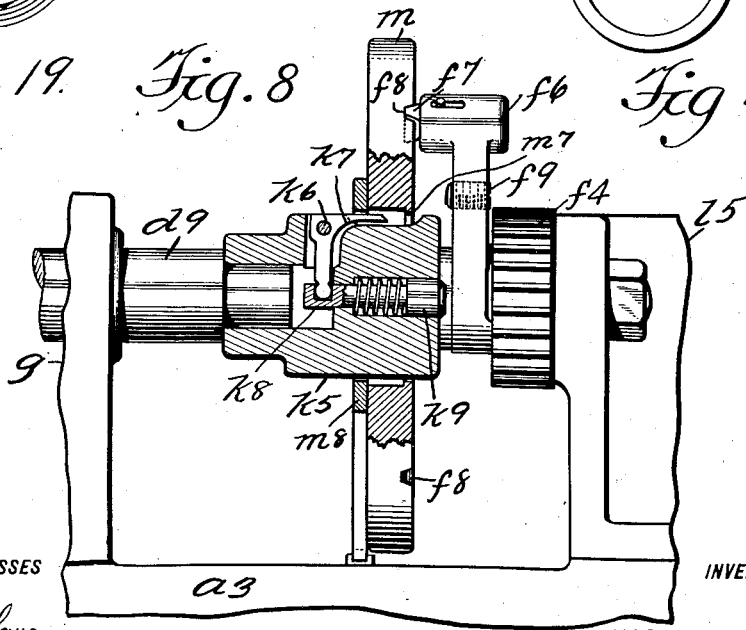
WITNESSES
INVENTOR
William B. Fenn
BY
Edgar Tate & Co
ATTORNEYS

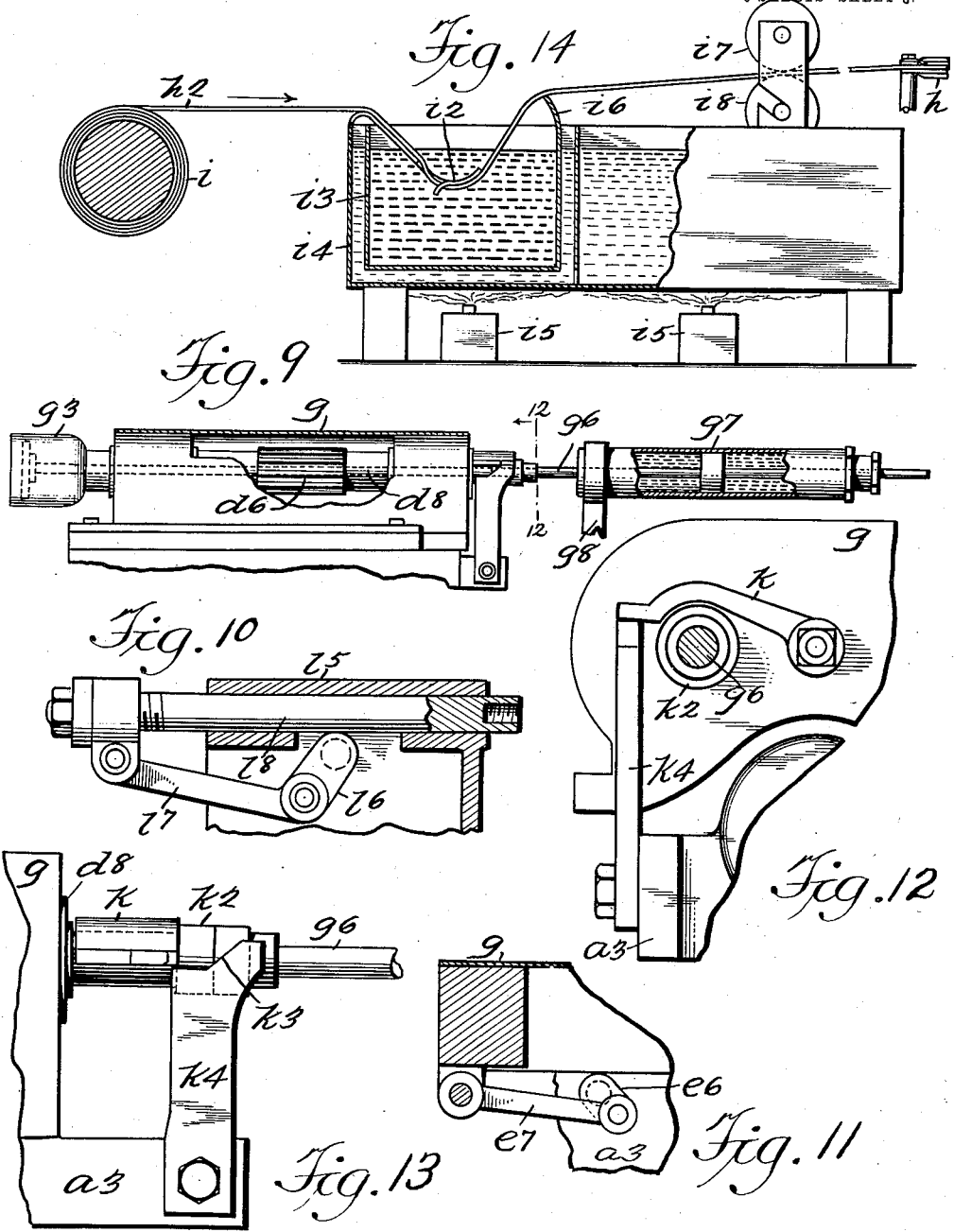

UNITED STATES PATENT OFFICE.

WILLIAM B. FENN, OF SHEEPSHEAD BAY, NEW YORK.

MACHINE FOR MAKING FIBROUS PACKINGS.

No. 819,269.   Specification of Letters Patent.   Patented May 1, 1906.

Application filed January 10, 1905. Serial No. 240,497.

*To all whom it may concern:*

Be it known that I, WILLIAM B. FENN, a citizen of the United States, residing at Sheepshead Bay, in the county of Kings and State of New York, have invented certain new and useful Improvements in Machines for Making Fibrous Packings, of which the following is a specification, such as will enable those skilled in the art to which it appertains to make and use the same.

The object of this invention is to provide a machine for making packing-bands for fruit-jars, bottles, and the like, said bands being composed of a ribbon or strip of fiber, paper, or other suitable absorbent material which is immersed in paraffin, wound spirally, and then compressed into the form shown in my application for a patent filed April 2, 1904, Serial No. 201,238, a further object being to provide a machine for the purpose specified which is automatic in all of its operations, removing the said strip of fiber from a coil at one side of the machine and delivering the finished packing-band at the other side thereof, the formation of the packing-bands being rapid and uninterrupted in the operation of the machine, a still further object being to provide a machine of this class which is simple in construction and positive in operation and whereby bands of any suitable size for various purposes may be formed.

The invention is fully disclosed in the following specification, of which the accompanying drawings form a part, in which the separate parts of my improvement are designated by suitable reference characters in each of the views, and in which—

Figure 1 is an end view of my machine for making fibrous packing-rings, said view being partially in section; Fig. 2, a side view thereof, partially in section and taken on the line 2 2 of Fig. 1; Fig. 3, a section on the line 3 3 of Fig. 1; Fig. 4, a section on the line 4 4 of Fig. 1; Fig. 5, a section on the line 5 5 of Fig. 1; Fig. 6, a section on the line 6 6 of Fig. 1; Fig. 7, a plan view of a portion of the machine, partially in section and showing the dies whereby said packing-rings are formed; Fig. 8, a section on the line 8 8 of Fig. 7; Fig. 9, a side view of a portion of the machine, partially in section and showing a die-carrier and dash-pot which I employ; Fig. 10, an enlarged partial section on the line 10 10 of Fig. 5; Fig. 11, an enlarged partial section on the line 11 11 of Fig. 3; Fig. 12, an enlarged fragmentary view of a tripping mechanism which I employ and taken on the line 12 12 of Fig. 9; Fig. 13, a side view thereof similar to that shown in Fig. 9, but somewhat enlarged; Fig. 14, an elevation, partially in section, of a tank which I employ for saturating the fibrous strip with paraffin; Fig. 15, a view of a detail of the construction, said detail being hereinafter referred to as a follower-ring; Fig. 16, an enlarged fragmentary view of a gripping device which I employ in the feeding of the fibrous strip; Fig. 17, an end view thereof and taken on the line 17 17 of Fig. 2; Fig. 18, an enlarged fragmentary view of a cutter-operating mechanism which I employ and taken on the line 18 18 of Fig. 2; and Fig. 19, an enlarged plan view of the fiber packing-ring when complete and showing the various layers thereof compressed to present a smooth surface on the inner and outer sides of said packing-ring.

In the drawings forming part of this specification I have shown a table comprising vertical supports $a$ and $a^2$ and a top member $a^3$, and rotatably mounted in the vertical supports $a$ and $a^2$ is a shaft $b$, which carries adjacent to one end thereof a gear $b^2$, enmeshed with a pinion $b^3$ on a shaft $b^4$, and upon the shaft $b^4$ is mounted a band-wheel $b^5$, and the shaft $b$ also carries three cams $d$, $e$, and $f$, one side of the gear-wheel $b^2$ being also provided with a cam $b^6$, and beneath the shaft $b$ and serving as a brace for the vertical supports $a$ and $a^2$ is a supplemental shaft $b^7$, upon which is rotatably mounted an upwardly-extending arm $d^2$, provided with a segment-rack $d^3$ on the top thereof, said segment-rack being enmeshed with a pinion $d^4$, to which is secured a gear-wheel $d^5$, which is in turn enmeshed with pinions $d^6$ and $d^7$, mounted upon shafts $d^8$ and $d^9$, respectively, the said shafts $d^8$ and $d^9$ being carried by a horizontally-movable casing $g$, slidably mounted in the top $a^3$ of the table, as shown at $g^2$.

Connected with the top $a^3$ and at one side thereof is a supplemental table member $c$, supported at the outer end thereof, as shown at $c^2$, and provided with a hanger $c^3$, to the lower end of which is pivotally connected a lever $c^4$, which is adjustably connected, as shown at $c^5$, with a connecting-rod $c^6$, the said connecting-rod $c^6$ being secured to a band $c^7$ of an eccentric $c^8$, mounted on the shaft $b$. Above the supplemental table $c$ is mounted a guide $h$, adapted to carry a strip of fiber $h^2$, which passes therethrough, the said guide $h$ being open at the top and bottom thereof, as shown at $h^3$, and slidably mounted on the guide $h$ is a casing $h^4$, provided with an upwardly-directed fixed member $h^5$, operating in the opening $h^3$ and normally bearing against the under side of the fibrous strip $h^2$, and the casing $h^4$ also carries a pivoted finger $h^6$, with which is pivotally connected an adjustable rod $h^7$, which is in turn connected with the upper end of the lever $c^4$, and in the rotation of the shaft $b$ the lever $c^4$ is oscillated and carries the casing $h^4$ backwardly and forwardly over the guide $h$, and in the backward or outer movement thereof the pivoted finger $h^6$ is released from the fibrous strip $h^2$; but in the forward or inward movement of the lever $c^4$ the pivoted finger $h^6$, together with the member $h^5$ of the casing $h^4$, firmly grips the fibrous strip $h^2$ and carries the said strip the full limit of the movement of the lever $c^4$, this movement being adjusted at will, as shown at $c^5$.

The fibrous strip $h^2$ is preferably provided in the form of a coil, as shown at $i$, and the said strip passes beneath a plate $i^2$ in a tank $i^3$, mounted in a supplemental tank $i^4$, the said tank $i^3$ being partially filled with paraffin or other similar preserving material and the casing $i^4$ being partially filled with water inclosing the casing $i^3$, the said water being heated by means of spirit-lamps $i^5$ beneath the tank $i^4$, or the said water may be heated in any other desired manner, and when the fibrous strip $h^2$ has passed through the paraffin in the tank $i^3$ it passes over a metal scraper $i^6$ and thence between rollers $i^7$ and $i^8$, which remove the superfluous wax which may be on the fibrous strip $h^2$, and after passing through the rollers $i^7$ and $i^8$ the fibrous strip enters the guide $h$ and is adapted to be engaged and drawn forwardly by the members $h^5$ and $h^6$ of the casing $h^4$, as previously described.

Secured to the shaft $d^8$ and at the front of the casing $g$ is a hollow head $g^3$, which is tapered inwardly, as shown at $g^4$, and within the hollow head $g^3$ is a laterally-movable plunger $g^5$, secured to a shaft $g^6$, which passes through the shaft $d^8$, and the shaft $g^6$, as shown in Fig. 9, passes into a dash-pot $g^7$, rigidly connected with a support $g^8$, mounted on the top $a^3$ of the table, and the shaft $g^6$ is provided with a piston within the dash-pot $g^7$, and the said dash-pot is preferably filled with oil, thereby permitting a partial compression thereof within the dash-pot $g^7$, and pivoted to the casing $g$, as shown in Fig. 12, is an arm $k$, which is adapted to engage a flange $k^2$ on the shaft $g^6$ in the operation of the machine and be disengaged therefrom by means of the inclined edge $k^3$ of an upright member $k^4$, secured to the top $a^3$ of the table.

Secured to the shaft $d^7$ at the end of the casing $g$ adjacent to the hollow head $g^3$ is a circular block $k^5$, provided with a recess, within which is pivoted, as shown at $k^6$, a finger $k^7$, the lower end of which is engaged by a spring-operated pin $k^8$, provided with an enlarged head $k^9$ at its outer end, the action of the spring serving to force the head $k^9$ out of the circular block $k^5$, and the finger $k^7$ is adapted to engage the fibrous strip $h^2$, as will be hereinafter described.

In Fig. 3 of the drawings I have shown the cam $e$ in engagement with a vertical arm $e^2$, provided with a rack $e^3$ thereon, and the rack $e^3$ engages a pinion $e^4$, mounted on a stub-shaft $e^5$, to the other end of which is secured a crank-lever $e^6$, and pivotally connecting the crank-lever $e^6$ with the lower side of the casing $g$, as plainly shown in Fig. 11, is a connecting-rod $e^7$, and it will be seen that in the operation of the shaft $b$ the cam $e$ is rotated, the vertical arm $e^2$ moved upwardly and downwardly, thereby oscillating the casing $g$, together with the shafts $d^8$ and $d^9$, mounted therein, and the pinions $d^6$ and $d^7$ are elongated, as shown in Fig. 9, to permit of lateral movement of the shafts $d^8$ and $d^9$ without disengaging the pinions $d^6$ and $d^7$ from the gear-wheel $d^5$.

In Fig. 5 of the drawings I have shown a side view of the gear-wheel $b^2$ and also the cam $b^6$ arranged therein, the said cam $b^6$ being in operative connection with a vertical arm $l$, provided with a rack $l^2$, which is enmeshed with a pinion $l^3$, mounted on a shaft $l^4$, mounted in a support $t^5$, and on the top $a^3$ of the table and on the outer end of the shaft $l^4$ is a crank-arm $l^6$, which is pivotally connected with a connecting-rod $l^7$, which is in turn pivotally connected with a shaft $l^8$, operating in the support $l^5$, and on the outer end of the shaft $l^8$, as clearly shown in Fig. 7, is a head $l^9$, which is provided with a spiral rib thereon, and the reason for which will be hereinafter explained. The axis of the shaft $l^8$ being in line with the axis of the shaft $d^8$ and the spiral ribbed head $l^9$ is adapted to be forced into the tapered end $g^4$ of the hollow head $g^3$ in the operation of the machine.

In Fig. 6 of the drawings I have shown the side of the cam $f$, said cam being in operative connection with a vertical arm $f^2$, provided with a rack $f^3$, enmeshed with a pinion $f^4$, mounted on a shaft $f^5$, and secured to the shaft $f^5$ is an arm $f^6$, adapted to be oscillated in the vertical movement of the arm $f^2$, and said arm $f^6$, as clearly shown in Fig. 8, is provided with a spring-operated finger $f^7$, adapted to engage one of a plurality of recesses $f^8$ in a carrier-disk $m$. The said carrier-disk is rotatably mounted on the shaft $f^5$ and is adapted to be rotated through a predetermined arc of a circle by the movement of the arm $f^6$ when engaged with the carrier-disk $m$, as shown in Fig. 8, and the arm $f^6$ is provided with an extending plug $f^9$, which projects beyond the vertical plane of the head in the circular block $k^5$, and when the arm $f^6$ is oscillated the plug $f^9$, striking against the head $k^9$ of the pin $k^8$, forces the same inwardly against the action of the spring thereon and in this operation depresses the finger $k^7$ and forces it against the solid portion of the circular block $k^5$, and in this manner a strip of fiber is engaged and held. The carrier-disk $m$, as shown in the drawings, is provided with a plurality of circular openings $m^2$, $m^3$, $m^4$, and $m^5$, each of which is provided with a peripheral slot $m^6$, and the openings $m^2$, $m^3$, $m^4$, and $m^5$ are flanged integrally on one side, as shown at $m^7$, and permanently secured adjacent to the carrier-disk $m$ on the side opposite the flange $m^7$ is a plate $m^8$, provided with an opening slightly smaller than the openings $m^2$, $m^3$, $m^4$, and $m^5$, thereby providing a flange for that one of the circular openings in the carrier-disk $m$ which is in the position of the circular head $k^5$, and in the operation of my machine the head $k^5$ is adapted to pass through the plate $m^8$ and the carrier-disk $m$.

In Fig. 2 of the drawings I have shown a cutting device in operation with the guide for the strip of fiber $h^2$, said cutting device being shown at $n$ and being shown in detail in Fig. 18. Beneath the guide $h$ is a fixed blade $n^2$, and directly thereover is a vertically-movable blade $n^3$, to the shank $n^4$ of which is secured a plate $n^5$, against which normally bears a spring $n^6$, forcing said plate $n^5$ and cutter-blade $n^3$ upwardly, and slightly above and at one side of the plate $n^5$ is a longitudinally-arranged rotatably-mounted rod $o$, carried in suitable supports $o^2$ and provided at its inner end with a crank-arm $o^3$, in which is secured a pin $o^4$, the said pin $o^4$ operating in jaws $p$ by a vertically-movable bar $p^2$, provided with a slot $p^3$, through which the rod $o$ passes, and the rod $o$ is also provided with a finger $o^5$, bearing on the top of the plate $n^5$. As will be seen, by means of this construction when the bar $p^2$ is moved downwardly the rod $o$ is rotated correspondingly and the finger $o^5$ thereon depresses the cutting-blade $n^3$, which, together with the cutter-blade $n^2$, cuts through the strip of fiber $h^2$, this cutting occurring when the lever $c^4$ commences its backward movement to reëngage the strip of fiber $h^2$, and the cutter-blades $n^2$ and $n^3$ may be made of any desired shape in order to produce a square V or W shaped end to the fiber strip, and the rod $o$ is also provided with a coil-spring $o^6$, mounted thereon and secured thereto and to the adjacent support $o^2$, the coil-spring $o^6$ being adapted to turn the rod $o$ to its normal position in the upward movement of the bar $p^2$. The vertically-movable bar $p^2$ is mounted in suitable guides on the top $a^3$ of the table and is provided at its lower end with a pivoted finger $p^4$, normally forced outwardly against a pin $p^5$ by means of a spring $p^6$, and mounted in the vertical arm $f^2$ is a bolt $p^7$, provided with an angular and preferably inclined head $p^8$, and in the downward movement of the vertical arm $f^2$ the inclined head $p^8$ strikes against the end of the pivoted finger $p^4$ and forces the arm $p^2$ downwardly; but the pin $p^5$, against which the finger $p^4$ bears, gradually forces said finger $p^4$ out of engagement with the head $p^8$, and when the finger $p^4$ is so released the bar $p^2$ is free to move upwardly and the rod $o$ resumes its normal or initial position by means of the coil-spring $o^6$, and in this way the cutting device has resumed its initial position and is ready for another operation.

As will be seen with reference to Figs. 3, 5, and 6, I prefer to mount on the shaft $b$ an angular block $r$, rotatable on said shaft, said angular block $r$ being adapted to operate in an angular recess $r^2$ of the vertical arms $e^2$, $f^2$, and $l$, the said arms carrying also a roller-bearing $r^3$, (indicated in dotted lines in these figures,) which moves in the groove of the cams $e$, $f$, and $b^2$, and because of this construction the said vertical arms move upwardly and downwardly without transverse or oscillating movement, and the action of the racks on said arms with the corresponding pinions is positive at all times.

In the practice of my invention the strip of fiber $h^2$ is passed through the paraffin-bath $i^3$, which has been heated by means of the lamp $i^5$, and is then passed between the rollers $i^7$ and $i^8$ and manually drawn therethrough and is then inserted into the end of the guides $h$ until the feeding apparatus or the fingers $h^5$ and $h^6$ thereof have engaged the end of said strip of fiber, at which time in the operation of the machine the said strip is drawn through the guide, so that the end thereof is slightly beyond the cutting device $n$, at which time the blade $n^3$ descends and cuts off the irregular end of the fibrous strip, this waste end being removed manually, and at this time the casing $h^4$ of the feeding apparatus has again returned to its clutching position and reëngaging the fibrous strip draws the same through the guide $h$ a predetermined distance, and the end of the fibrous strip $h^2$ which was trimmed off in the first operation of the cutter-blade $n^3$ is at this time closely adjacent to the carrier-disk $m$, and at this time the cutter-blade $n^3$ again descends and cuts off a predetermined length of the fibrous strip $h^2$, and the feeding apparatus or the casing $h^4$ thereof is again returned to its clutching position. When the fibrous strip is again drawn forwardly, the detached portion of the said fibrous strip passes through the corresponding slot $m^6$ and into the circular opening $m^2$, and just previous to the feeding of the fibrous strip the vertical arm $e^2$ is drawn downwardly, thereby moving the casing $g$ forwardly, and the circular block $k^5$ and hollow head $g^3$ have been moved thereby, the circular block $k^5$ having passed through the circular opening $m^2$, as clearly shown in Fig. 7, and at this time the vertical arm $f^2$ has been operated to force the arm $f^6$ backwardly and downwardly by means of the cam $f$, and in the backward movement of the arm $f^6$ the plug $f^9$ thereof engages the head $k^9$ of the pin $k^8$ in the circular block $k^5$ and forces said pin backwardly at about the same instant that the lever $c^4$ of the feeding apparatus is again operated to feed the fibrous strip, the trimmed end of said fibrous strip having passed under the finger $k^7$ in the circular block $k^5$, and when the pin $k^8$ is so forced backwardly the finger $k^7$ in the circular block $k^5$ grips the end of the fibrous strip and holds the same firmly. When the fibrous strip $h^2$ has been engaged by the finger $k^7$, as just described, the pivoted lever $d^2$ is operated by means of the cam $d$, thereby rotating the shaft $d^9$ and the circular block $k^5$, mounted thereon, this rotary movement forming an annular band within the opening $m^2$ of the detached portion of the fibrous strip $h^2$, and this annular band is held in the circular opening $m^2$ by means of the permanent flange $m^7$ and the independent flange $m^8$, and at this time the vertical arm $e^2$ is operated in the opposite direction by means of the cam $e$, and the casing $g$ carries back the circular head $k^5$ out of the opening $m^2$, leaving the fibrous strip spirally formed therein. When the circular head $k^5$ is entirely out of the said opening $m^2$, the arm $f^6$ has reëngaged the carrier-disk $m$ by means of one of the radial recesses $f^8$ therein, and the vertical arm $f^2$ returns to its initial position, carrying the arm $f^6$ and the carrier-disk through a predetermined arc of a circle, in the present form of construction said arc being ninety degrees for the reason that there are four circular openings in the disk $m$. In the forward movement of the carrier-disk resulting from the downward movement of the vertical arm $f^2$ the bar $p^2$ has been moved downwardly, and thereby operated the cutter-blade $m^3$, and another portion of the fibrous strip has been detached, and the lever $c^4$ again moves backwardly and reëngages the fibrous strip and draws the same forwardly, the circular head $k^5$ having, as previously described, entered the circular opening $m^5$, which has been moved to the position originally held by the circular opening $m^2$, and the second detached portion of the fibrous strip $h^2$ has been engaged by the finger $k^7$ because of the backward movement of the arm $f^6$, and on the rotary movement of the block $k^5$ the second detached portion of the fibrous strip has been spirally formed within the circular opening $m^5$, and the carrier-disk $m$ is again rotated through an arc of ninety degrees upon the withdrawal of the circular block $k^5$ therefrom, and this operation of feeding, cutting, clutching, and winding is continuous. The circular opening $m^2$ has now been carried to a position directly opposite that previously occupied by it, said position being directly in line with the hollow head $g^3$, and when the casing $g$ is forced forwardly it not only carries the circular block $k^5$ therewith, but brings the hollow head $g^3$ closely adjacent to the circular opening in the disk $m$ which is in line therewith, that opening being $m^2$ in the present stage of the operation, and when the arm $f^6$ is moved backwardly to reëngage the carrier-disk $m$ and to operate the finger $k^7$ the spiral-ribbed head $e^9$ is forced through the opening $m^2$ in the carrier-disk $m$ by means of the vertical arm $l$ and the cam $b^6$ in the gear-wheel $b^2$ in operation therewith, and in the forward movement of the spiral-ribbed head $e^9$ the spirally-arranged strip of fiber in the opening $m^2$ is forced into the tapered portion $g^4$ of the hollow head $g^3$ by means of the shouldered end of the head $e^9$, and this compresses the spirally-arranged portion of fibrous strip and practically produces a solid annular band provided with a spiral groove therein formed by the spiral rib on the head $e^9$.

It will be understood that the parts of my machine are made very strong in order to produce a powerful pressure in the portion $g^4$ of the head $g^3$, and at this time the lever $d^2$ being operated by the cam $d$, rotates the shafts $d^8$ and $d^9$, thereby rotating the circular block $k^5$, as previously described, as well as the hollow head $d^3$, this rotary movement being in a direction away from the spiral rib on the head $e^9$, and at the instant the head $e^9$ is withdrawn from the opening $m^2$ the rotary movement of the head $g^3$ unwinds the annular band formed therein from the spiral-ribbed head $e^9$. In the backward movement of the casing $g$ the circular head $k^5$ is withdrawn from the circular opening in which it had last operated to form another spirally-arranged fibrous strip and the head $g^3$ is withdrawn from its proximity to the carrier-disk $m$, and when the casing $g$ has nearly reached its extreme backward position the plate $k$, pivoted thereon, engages the shoulder $k^2$ on the shaft $g^6$ and forces the piston $x\,x$ thereon within the dash-pot $g^7$ against the action of the oil contained therein, thereby compressing said oil, and on the continued backward movement of the casing $g$ the plate $k$ engages the inclined surface $k^3$ of the support $k^4$, which disengages said plate from the shoulder $k^2$, and the shaft $g^6$ is shot forwardly, carrying the plunger $g^5$ with it, and the plunger $g^5$, striking against the annular band formed of the fibrous strip contained in the tapered portion $g^4$ of the head $g^3$, drives the same outwardly and into a chute or suitable receptacle $s$ adjacent to said head $g^3$. It will therefore be seen that at the instant of feeding a detached portion of the fibrous strip into the corresponding circular opening in the carrier-disk $m$ during the operation of my machine there are already two other circular openings in the disk $m$ provided with a spirally-arranged fibrous strip and the spiral-ribbed head $e^9$ has been forced forwardly through the corresponding circular opening in the carrier-disk $m$ and the spirally-arranged portion of the fibrous strip contained therein has been compressed, as previously described. At the instant of winding a detached portion of fibrous strip in that circular opening adjacent to the feeding-point the finished annular band is being unwound from the spiral-ribbed head $e^9$, and in the backward movement of the circular block $k^5$ and the hollow head $g^3$ the head $e^9$ has also moved backwardly and the arm $f^6$ has been moved backwardly and reëngaged the carrier-disk $m$, and when the heads have been moved to their extreme backward position the arm $f^6$ is operated to rotate the carrier-disk $m$ through an arc of ninety degrees, and thereby bring a circular opening in the disk $m$ adjacent to the feeding-point and ready for the operation of winding a strip of fiber therein, and this operation is continued, as will be readily understood.

The operation above described forms in the inner surface of the annular ring or band $t$ so formed a thread which is adapted to engage the corresponding thread on the neck of a jar or other vessel, as shown and described in the application for Letters Patent of the United States hereinbefore referred to; but the invention described and claimed herein is not limited to the formation of such thread.

In the high pressure necessary to produce the annular band, as shown in Fig. 19 and indicated by the reference character $t$, a raw edge or slight flange is likely to be formed thereon, due to varying thicknesses of the fibrous strip, and to obviate this I provide an annular ring $t^2$, of spring metal, arranged at the rear of the spiral rib on the head $e^9$, this arrangement permitting the head $e^9$ to enter the tapered opening $q^4$ of the hollow head $g^3$ a greater distance than if the ring $t^2$ were solid or an integral portion of the head itself, thereby making a clean smooth edge at the larger side of the annular band $t$.

The annular band is shown removed from the machine and not shown in either of the positions of forming the same in order that the mechanical arrangements of my machine may be clearly shown, and the ring $t^2$ instead of being cut away at one side thereof may be spirally arranged to permit elasticity and also to preserve a smooth surface on its impact side.

My machine is readily adaptable for making packing-bands of various sizes, all that is necessary being to replace the carrier-disk $m$, as shown, with one or greater of less dimensions and to provide corresponding heads $e^9$ and $g^3$ and a circular block $k^5$ therefor, the adjustable feature of the arm $c^4$, as shown at $c^5$, permitting of a greater or less length of the fibrous strip, according to the size of the packing-band which it is desired to produce, and while I have shown cam movements to produce the various operations of my machine it will be obvious that gearing might be employed or levers or any other suitable well-known mechanical equivalent, and various other changes in and modifications of the construction herein shown and described may be made without departing from the spirit of my invention or sacrificing its advantages.

Having fully described my invention, what I claim as new, and desire to secure by Letters Patent, is—

1. A machine for making packing-rings for bottles, jars and the like, comprising a rotatable disk provided with a plurality of circular openings and a slot for each of said openings through which a strip of fiber is adapted to be passed, a feed for said fibrous material, a cutting device for said fibrous material, devices for arranging said fibrous material spirally in the opening of said disk adjacent to said fibrous strip, devices for rotating said disk through a predetermined arc, a hollow tapered head adjacent to the subsequent position of the opening containing said spirally-arranged fibrous strip, and a head passed through said opening and forcing said spirally-arranged fibrous strip against the tapered surface of said hollow head and compressing the same, substantially as shown and described.

2. A machine for making packing-rings for bottles, jars and the like, comprising a guide through which a strip of fibrous material may be passed, a feed for said fibrous strip, a tank containing paraffin or similar material through which said fibrous strip passes, a cutting device for detaching predetermined lengths of said fibrous strip, and devices for winding each of said detached portions spirally and compressing the same and forming an annular band thereof, substantially as shown and described.

3. In a machine of the class described, a disk provided with a plurality of openings and peripheral slots therefor, a guide adjacent to one of said openings and through which a strip of fibrous material may be passed, a feed for forcing said strip into said last-named opening, a cutting device for said strip, and means for winding the detached portions of said strip spirally in said opening, said cutting device comprising a fixed blade beneath said strip, a vertically-movable blade in operation with said fixed blade above said strip, and means connected with the machine for forcing said vertically-movable blade downwardly, said means comprising a rod, a finger thereon bearing on the top of said vertically-movable blade, a crank-arm on said rod, a pin on said crank-arm, a vertically-movable bar provided with jaws which engage said pin, a power-shaft, a cam thereon, a vertically-movable arm in operative connection with said cam, a bolt provided with an inclined head on said arm, a pivoted finger on said bar and adapted to engage with said inclined head in the downward movement of said vertically-movable arm, a pin against which said spring bears, said pin being adapted to force said finger away from said inclined bolt and be released therefrom in the downward movement thereof, and a coil-spring on said rod for returning said rod and bar to their normal positions, substantially as shown and described.

4. In a machine of the class described, a disk provided with a plurality of openings and peripheral slots therefor, a guide adjacent to one of said openings and through which a strip of fibrous material may be passed, a cutting device for separating said fibrous strip into predetermined lengths, a feed for forcing one of said detached portions of said strip into said last-named opening, a horizontally-movable block in said last-named opening, a spring-operated finger thereon engaging said strip of fibrous material, a power-shaft, a cam thereon, and means for rotating said horizontally-movable block, comprising a pivoted lever provided with a rack in operative connection with said cam, a pinion in operation with said rack, a gear-wheel secured to said pinion, a shaft upon which said horizontally-movable block is mounted, said shaft being provided with a pinion and meshed with said gear-wheel, substantially as shown and described.

5. In a machine of the class described, a disk provided with a plurality of openings and peripheral slots therefor, a guide adjacent to one of said openings and through which a strip of fibrous material is adapted to pass, a blade for separating said fibrous material into predetermined lengths, a feed for forcing one of said lengths into the corresponding one of said openings, a rotatable block in said opening, a spring-operated finger thereon engaging said fibrous strip, a horizontally-movable casing, a shaft therein upon which said block is mounted, a power-shaft, a cam thereon, a vertically-movable arm in operative connection with said cam, a pinion engaging a rack on said arm, a crank-lever connected with said pinion, a connecting-rod connecting said crank with said casing, and means for rotating said block, substantially as shown and described.

6. In a machine of the class described, a disk provided with a plurality of openings and peripheral slots therefor, said disk being provided with a plurality of radial slots, a pivoted arm adjacent to said disk, a spring-operated finger in said arm adapted to engage one of said radial slots, and means for moving said arm through a predetermined arc of a circle, substantially as shown and described.

7. In a machine of the class described, a disk provided with a plurality of openings, and peripheral slots therefor, said disk being provided with a plurality of radial slots, a pivoted arm adjacent to said disk, a spring-operated finger in said arm adapted to engage one of said radial slots, and means for moving said arm through a predetermined arc of a circle, comprising a power-shaft, a cam thereon, a vertically-movable arm provided with a rack in operative connection with said cam, and a pinion secured to said first-named arm and meshed with said rack, substantially as shown and described.

8. In a machine of the class described, a rotatable disk provided with a plurality of openings and peripheral slots therefor, each of said openings being adapted to receive a strip of fibrous material, devices for winding said strip of fibrous material spirally in said opening, a tapered hollow head adjacent to said disk, a spirally-ribbed head, and means for forcing said spirally-ribbed head through the opening in said disk and into said hollow head, substantially as shown and described.

9. In a machine of the class described, a disk provided with a plurality of openings and peripheral slots therefor, devices for winding a strip of fibrous material in each of said openings consecutively, a head provided with a spiral rib, a hollow head in line with said spirally-ribbed head, devices for moving said spirally-ribbed head through said opening thereby forcing said spirally-arranged strip of fiber into said hollow head and compressing the same, and means for removing said fibrous material when compressed from said hollow head, substantially as shown and described.

10. In a machine of the class described, a disk provided with a plurality of openings and peripheral slots therefor, devices for winding a strip of fibrous material in each of said openings consecutively, a head provided with a spiral rib, a hollow head in line with said spirally-ribbed head, devices for moving said spirally-ribbed head through said opening thereby forcing said spirally-arranged strip of fibrous material into said hollow head and compressing the same, and means for removing said fibrous material when compressed from said hollow head, comprising a plunger in said hollow head, a dash-pot in operative connection with said plunger, tripping devices in operative connection with said hollow head and said plunger, and devices for disconnecting said tripping device from said plunger, substantially as shown and described.

11. In a machine of the class described, a table, a horizontally-movable casing on said table, a plurality of shafts mounted in said casing, a circular block on one of said shafts, a hollow head on the other of said shafts, devices for moving said casing horizontally, and means for rotating said shafts, substantially as shown and described.

12. In a machine of the class described, a disk provided with a plurality of circular openings and each of said openings being provided with peripheral slots, and with an integral flange at one side thereof, devices for rotating said disk through an arc of a circle, and an independent plate adjacent to said disk and provided with an opening slightly smaller than each of said circular openings, said plate serving as a flange for each of said openings consecutively, substantially as shown and described.

13. In a machine of the class described, a disk provided with a plurality of openings and peripheral slots communicating therewith, means for rotating said disk, a guide adjacent to one of said openings and through which a strip of fibrous material may be passed, a feed for forcing said strip into said last-named opening, a cutting device for cutting said strip, means for winding the detached portions of said strips spirally in said openings, devices for compressing said spirally-wound strip so as to form a ring, and means for removing said ring, substantially as shown and described.

14. In a machine for making packing-rings, a rotatable disk provided with a plurality of circular openings into which a strip of fibrous material of a predetermined length is adapted to be passed, devices for winding said strips of fibrous material spirally and successively in each of said openings, devices for compressing said strips in said openings so as to form a ring, and means for removing the ring so formed, substantially as shown and described.

15. In a machine of the class described, a rotatable disk having circular openings and peripheral slots communicating therewith, means for feeding strips of fibrous material successively into said openings, a rotatable block operating in said openings and adapted to engage the strips of fibrous material and to wind the same thereon, devices for removing a spirally-arranged strip from said block, means for compressing the spirally-arranged strip to form a ring, and devices for removing said ring, substantially as shown and described.

16. In a machine for making packing-rings, a disk provided with a plurality of openings and peripheral slots communicating therewith, a guide adjacent to one of said openings and through which a strip of fibrous material may be passed, a feed device for said fibrous strip, a cutting device for said strip, a block adjacent to said guide and adapted to rotate in said disk adjacent to said openings, a spring-operated plunger on said block for engaging the end of said fibrous strip so as to form the latter into a spirally-arranged ring, devices for withdrawing said block from the opening in said disk after the release thereof, devices for moving said disk through an arc of a circle, devices for compressing the spirally-arranged strip into ring form and means for removing the ring so formed, substantially as shown and described.

17. In a machine of the class described, a disk provided with a plurality of circular openings circularly arranged and peripheral slots communicating therewith, means for rotating said disk, a guide adjacent to one of said openings and through which a strip of fibrous material may be passed, a feed for forcing said strip into said last-named opening, a device for cutting said strip, means for winding the detached portion of said strip spirally in said opening, devices for compressing the spirally-arranged strip to form a ring, and means for removing said ring, substantially as shown and described.

18. In a machine for making packing rings or bands, a rotatable disk provided with a plurality of circularly-arranged circular openings and peripheral slots communicating therewith, means for winding a strip of fibrous material in said openings to form a ring composed of separate layers, means for saturating said strip before it is wound in said opening, means for compressing the spirally-formed strip to form a ring, and devices for removing said ring, substantially as shown and described.

19. In a machine of the class described, a carriage, two shafts rotatably mounted therein and carried thereby, a block on one of said shafts, a hollow head on the other of said shafts, and devices for rotating said shafts in opposite directions, substantially as shown and described.

20. In a machine of the class described, a carriage, a plurality of shafts rotatable therein and carried thereby, a block on one of said shafts, a hollow head on another of said shafts, a piston in said hollow head, and means for forcing said piston forwardly at a predetermined time in the forward movement of said carriage, substantially as shown and described.

21. In a machine of the class described, a carriage, a shaft rotatably mounted thereon and carried thereby, a block on the end of said shaft, a pivoted finger on said block, a spring bearing against said finger and internal means for operating said finger against said spring, substantially as shown and described.

22. In a machine of the class described, a carriage, a shaft rotatably mounted thereon and carried thereby, a hollow head on the end of said shaft, a piston in said hollow head, a rod secured to said piston and passing through said shaft, a dash-pot in which the piston-rod operates, a lock mounted on said carriage and in operative connection with said piston-rod to move said rod backwardly in the movement of said carriage, and means for releasing said lock from said rod, substantially as shown and described.

23. In a machine of the class described, a rotatable disk provided with a plurality of circular openings, a shaft, a hollow head thereon, devices for moving said head to a position adjacent to one of said openings, a plunger on the opposite side of said disk, devices for forcing said plunger through said disk and into said hollow head, and means for rotating said head in one direction in the forward movement of said plunger and in the opposite direction in the backward movement of said plunger, substantially as shown and described.

In testimony that I claim the foregoing as my invention I have signed my name, in presence of the subscribing witnesses, this 7th day of January, 1905.

WILLIAM B. FENN.

Witnesses:
    F. A. STEWART,
    C. J. KLEIN.